United States Patent
Tsai

(10) Patent No.: US 7,926,159 B2
(45) Date of Patent: Apr. 19, 2011

(54) SYSTEM AND PROCESS FOR ASSEMBLING CAMERA MODULES

(75) Inventor: Kun-Jung Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 901 days.

(21) Appl. No.: 11/848,200

(22) Filed: Aug. 30, 2007

(65) Prior Publication Data
US 2008/0201939 A1    Aug. 28, 2008

(30) Foreign Application Priority Data
Feb. 28, 2007    (CN) .......................... 2007 1 0200243

(51) Int. Cl.
*B23Q 17/00*    (2006.01)
*B23P 21/00*    (2006.01)

(52) U.S. Cl. ............... 29/407.04; 29/407.01; 29/407.09; 29/407.1; 29/721; 29/720; 29/702; 29/464

(58) Field of Classification Search ................ 29/720, 29/721, 722, 702, 703, 407.01, 407.04, 407.09, 29/407.1, 464, 460, 453
See application file for complete search history.

(56) References Cited

U.S. PATENT DOCUMENTS

| | | | |
|---|---|---|---|
| 5,729,895 A * | 3/1998 | Kim ................................ 29/833 |
| 7,587,803 B2 * | 9/2009 | Montfort et al. ............. 29/407.1 |
| 7,845,058 B2 * | 12/2010 | Chen .......................... 29/407.01 |
| 2005/0024506 A1 * | 2/2005 | Nakakuki et al. ........ 348/231.99 |
| 2010/0085474 A1 * | 4/2010 | Morita .......................... 348/374 |
| 2010/0188528 A1 * | 7/2010 | Iwata et al. .............. 348/231.99 |
| 2010/0265387 A1 * | 10/2010 | Yen ................................ 348/345 |

FOREIGN PATENT DOCUMENTS

| | | |
|---|---|---|
| CN | 2621304 Y | 6/2004 |
| CN | 1685707 A | 10/2005 |
| EP | 0662723 A1 | 7/1995 |
| JP | 06-204262 A | 7/1994 |
| JP | 2004-12960 A | 1/2004 |
| TW | 200834145 A * | 8/2008 |

OTHER PUBLICATIONS

Abstract of TW 200837416 A by Tsai, K., published Sep. 16, 2008.*

* cited by examiner

*Primary Examiner* — Essama Omgba
(74) *Attorney, Agent, or Firm* — Jeffrey T. Knapp

(57) ABSTRACT

Exemplary system and process for assembling a camera module are provided. The system includes a worktable, a light intensity sensor, a lens module holding device and a controlling unit. The worktable provide placement of the image sensor module thereon, thus a center of the image sensor having a coordinate value thereof. The lens module holding device can hold and move the lens module above the worktable, and it has a light source to emit parallel light that converged at a focus point, wherein the light intensity sensor can detect the focus point location and generating a signal associated with a coordinate value of the focus point. The controlling unit can receive the signal and instruct the lens module holding device to move the lens module toward the image sensor module so that the optical axis of the lens module is aligned with the center of the image sensor.

6 Claims, 5 Drawing Sheets

SYSTEM AND PROCESS FOR ASSEMBLING CAMERA MODULES

BACKGROUND

1. Technical Field

The present invention relates generally to system and process for assembling camera modules.

2. Description of Related Art

Nowadays, digital camera modules are widely accepted for their ease of use, digital image storage, immediate results and image management potential. With respect to a related camera module, they generally include a lens module, a base member, and an image sensor fixed on the base member. The image sensor and the base member are located at an image side of the lens module. The image sensor is configured for detecting optical signals representative of a target image and converting the optical signals into electronic signals. The image sensor usually is a charge coupled device (CCD) or a complementary metal-oxide semiconductor (CMOS) device. The lens module generally includes a lens barrel, a lens holder, at least a lens group, a spacer, and a filter (e.g., IR-cut filter). The lens group, the spacer and the filter are received in and arranged along an optical axis of the lens barrel. The lens holder defines an opening therein. An internal thread is defined on peripheral sidewalls of the opening. The internal thread is engaged together with an external thread of the lens barrel for thereby holding the lens barrel.

During the manufacture of the camera module, the at least one lens group, the filter, etc. are placed into the lens barrel and thereafter the lens barrel is threadedly coupled to the lens holder so as to form the lens module. Then, the lens module is mounted on the base member, thereby completing camera module assembly. Generally, before the lens module is mounted on the based member, there is a requirement for a center of the image sensor to be aligned with an optical axis of the lens module. A conventional method for meeting the above requirement is that of aligning the center of the image sensor with a center line of the lens barrel or a center line of an aperture opening of the lens barrel, based on an assumption that the center line of the lens barrel or the center line of the aperture opening is identical to an optical axis of the lens module. However, deviation between the optical axis of the lens module and the centerline of the lens barrel (or the center line of the aperture opening) inevitably exists, which results in an image quality of the camera module being degraded to some extent.

What is needed, therefore, is to provide system and process for assembling camera modules, thereby an optical axis of a lens module of an assembled camera module would be exactly aligned with a center of an image sensor of the assembled camera module.

SUMMARY

A first preferred embodiment provides a system for assembling a camera module, the camera module having a lens module and an image sensor module, the lens module having an optical axis associated therewith, the image sensor module including a base and an image sensor mounted on the base. The system includes a worktable with a coordinate system defined thereon, a light intensity sensor arranged on the worktable, a lens module holding device and a controlling unit. The worktable is configured (i.e., structured and arranged) for allowing placement of the image sensor module thereon, thus a center of the image sensor of the image sensor module has a coordinate value. The lens module holding device is configured for holding and moving the lens module in a manner such that the lens module is arranged above the light intensity sensor and the optical axis associated with the lens module is perpendicular to a main plane of the worktable. The lens module holding device has a parallel light source configured for emitting parallel lights toward the lens module. The parallel lights are parallel to the optical axis of the lens module and converge at a focus point on the light intensity sensor. The light intensity sensor is configured for detecting the focus point location and generating a signal associated with a coordinate value of the focus point. The controlling unit is configured for receiving the signal from the light intensity sensor and controlling movement of the lens module holding device and the lens module toward the image sensor module in a manner such that the optical axis of the lens module is aligned with the center of the image sensor based upon a coordinate relationship between the coordinate values of the focus point and the center of the image sensor.

A second preferred embodiment provides a process for assembling a camera module using the assembling system described above. The process comprises placing an image sensor module on a worktable, the image sensor module including a base and an image sensor mounted on the base, the worktable having a coordinate system defined thereon. A center of the image sensor of the image sensor module has coordinate values defined thereon. A light intensity sensor should be arranged on the worktable. A lens module having an optical axis associate therewith is also provided. The lens module is moved in a manner such that the lens module is arranged above the light intensity sensor with the optical axis associated with the lens module perpendicular to a main plane of the worktable. A plurality of parallel lights can be projected toward the lens module, the lights being parallel to the optical axis of the lens module, in a manner such that the lights converge at a focus point on the light intensity sensor. The focus point location should be detected and a signal associated with a coordinate value of the focus point then generated using the light intensity sensor. The signal can be received by the controlling unit. The lens module holding device can be made to move the lens module toward the image sensor module such that the optical axis of the lens module is aligned with the center of the image sensor based upon a coordinate relationship between the coordinate values of the focus point and the center of the image sensor.

Other advantages and novel features will become more apparent from the following detailed description of preferred embodiments when taken in conjunction with the accompanying drawings.

BRIEF DESCRIPTION OF THE DRAWINGS

Many aspects of the present system and process for assembling a camera module can be better understood with reference to the following drawings. The components in the drawings are not necessarily drawn to scale, the emphasis instead being placed upon clearly illustrating the principles of the present system and process for assembling for a camera module. Moreover, in the drawings, like reference numerals designate corresponding parts throughout the several views.

The exemplifications set out herein illustrate various preferred embodiments, in various forms, and such exemplifications are not to be construed as limiting the scope of the present system and process for assembling camera module in any manner.

DETAILED DESCRIPTION

Figure 1:
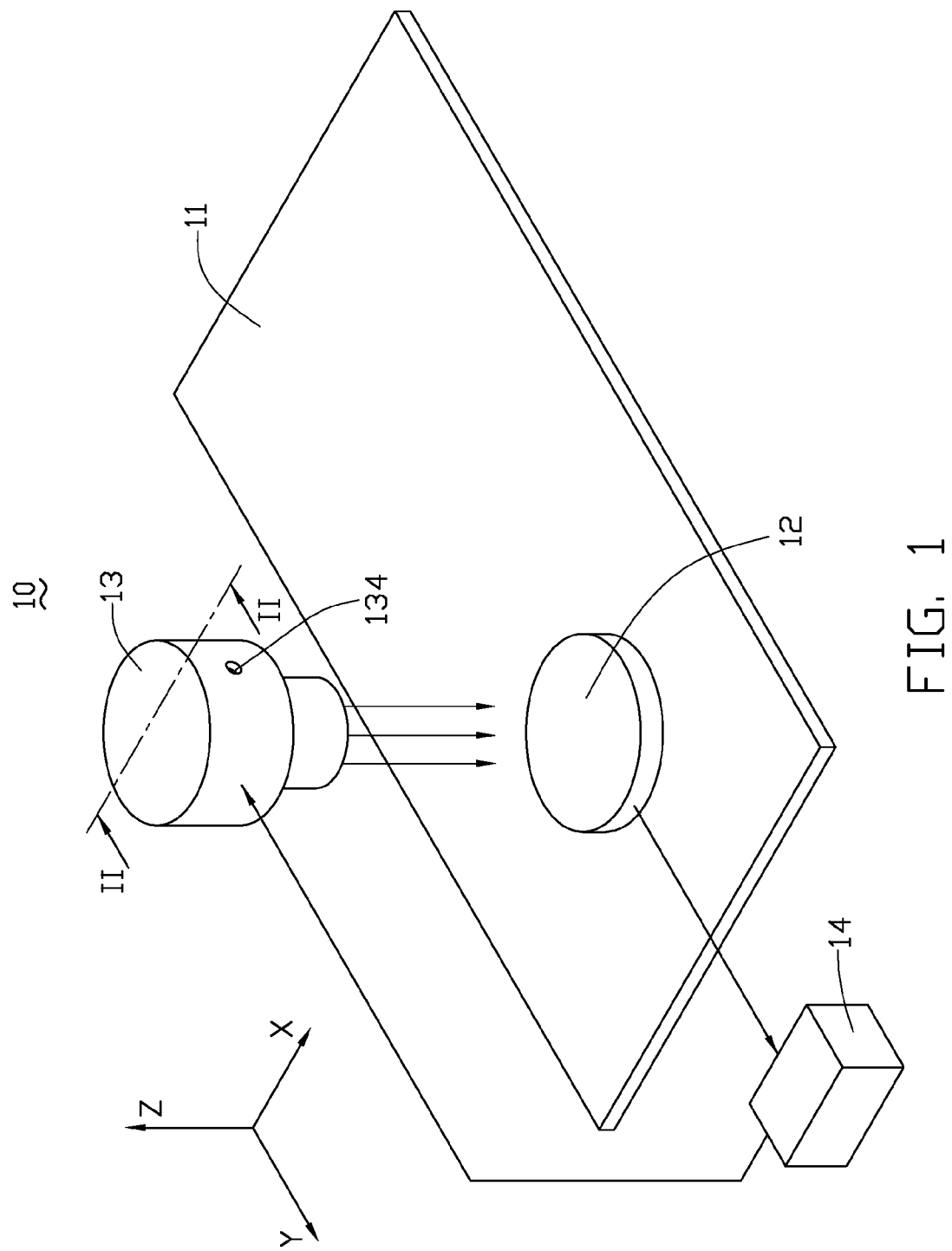
FIG. 1 is a schematic, isometric view of a system for assembling a camera module according to a first preferred embodiment, showing the system including a lens module holding device.
Figure 2:
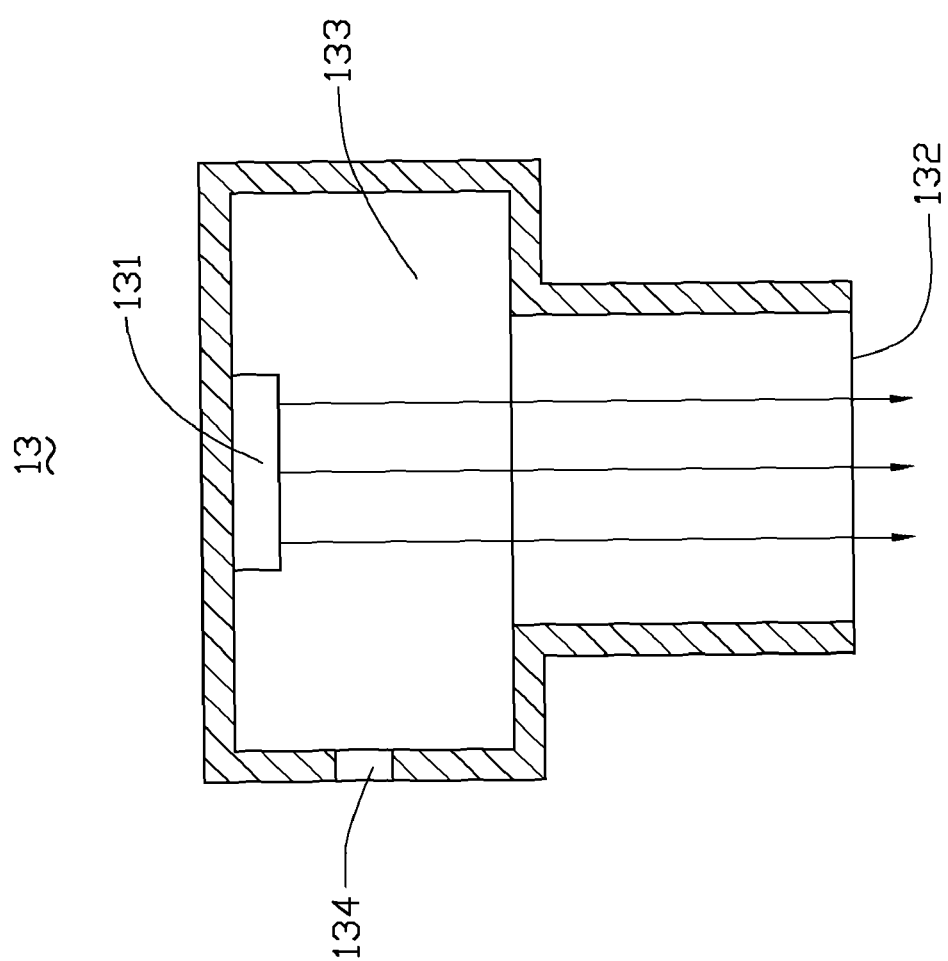
FIG. 2 is a schematic, cross-sectional views of the lens module holding device of the system in FIG. 1, taking along line II-II.
Figure 3:
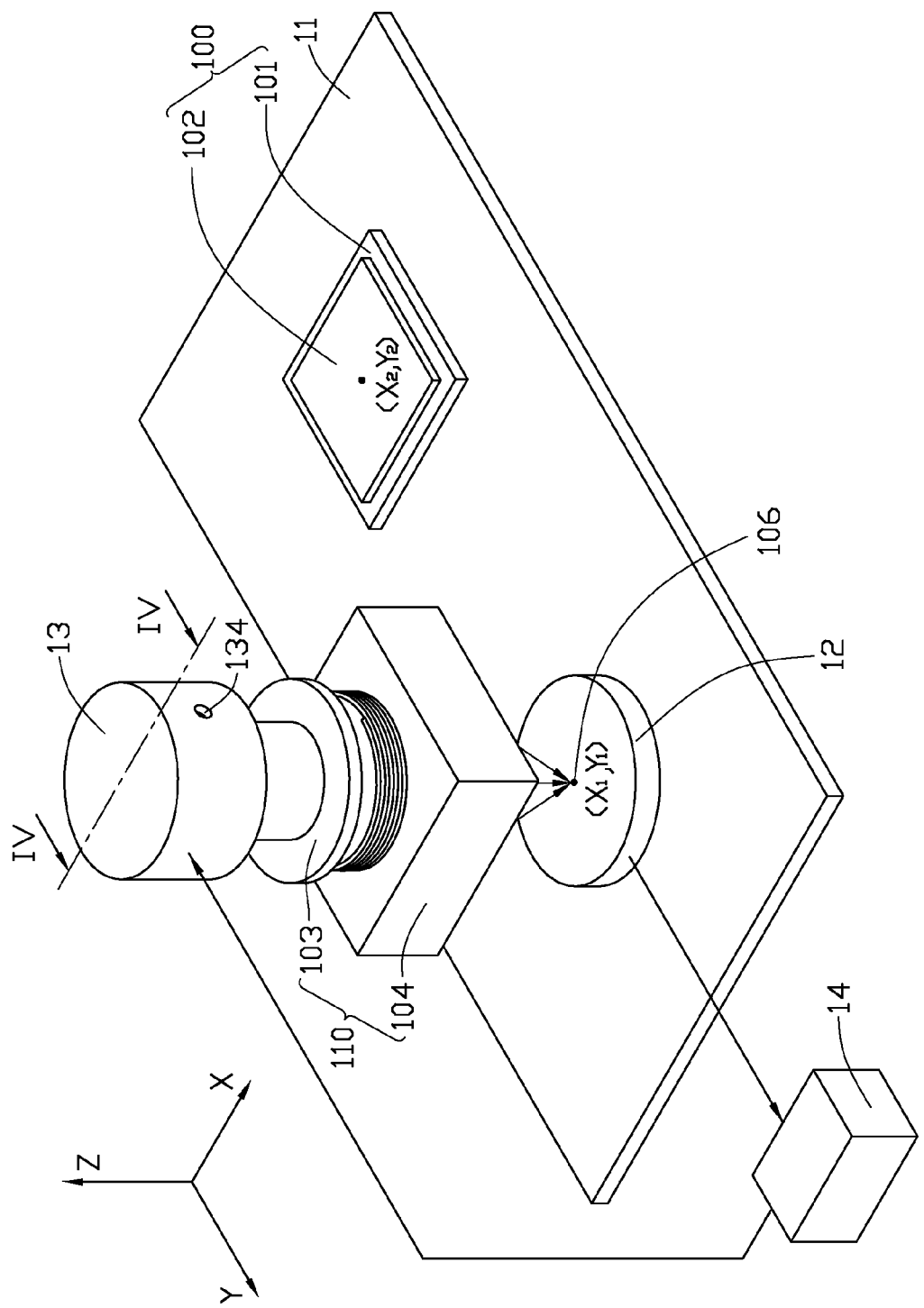
FIG. 3 shows a stage of process for assembling a camera module using the system of FIG. 1, for obtaining an image center of a lens module.

Referring to FIGS. 1 through 3, a system 10 for assembling a camera module, in accordance with a first preferred embodiment, is provided. The camera module includes a lens module 110 and an image sensor module 100. The lens module 110 has an optical axis associated therewith and the image sensor module 100 includes a base member 101 and an image sensor 102 mounted on the base member 101. The present system 10 includes a worktable 11, a light intensity sensor 12, a lens module holding device 13, and a controlling unit 14.

The worktable 11 with a coordinate system defined thereon is configured for predetermined placement of the image sensor module 100 thereon, thus a center of the image sensor 102 of the image sensor module 100 has initial coordinate values $(X_2, Y_2)$.

The light intensity sensor 12 is arranged on the worktable 11 and includes a number of sensing areas. Each of the sensing areas includes at least a pixel and can generate a signal after being irradiated by a light beam of a certain light intensity.

The lens module holding device 13 is movably located above the worktable 11 and configured for holding and moving the lens module 110 in a manner such that the lens module 110 is arranged above the light intensity sensor 12 and the optical axis associated with the lens module 110 is perpendicular to a main plane of the worktable 11. The lens module holding device 13 includes a parallel light source 131 and a suction opening 132 opposite to the parallel light source 131. The parallel light source 131 is configured for emitting parallel light (as indicated by the arrows in FIG. 2) toward the lens module 110. When the suction opening 132 captures the lens module by a suction force, the suction opening 132 contacts with the lens module 110 and the parallel light is vertically incident into the lens module 110 after passing through the suction opening 132. In the illustrated embodiment, the lens module holding device 13 further includes a vacuum chamber 133 having an adjustable inner pressure. The suction opening 132 is in communication with the vacuum chamber 133. The parallel light source 131 is disposed in the vacuum chamber 133 and opposite to the suction opening 132, thus allowing light emitted from the parallel light source 131 to pass through the suction opening 132. The vacuum chamber 133 generally is in communication with a vacuum pump via an opening 134 (as shown in FIG. 2) defined therein allowing the inner pressure to be adjustable.

The controlling unit 14 is electrically connected to the light intensity sensor 12 and the lens module holding device 13. Information representative of coordinate values of the center of image sensor 102 on the worktable 11 is recorded in the controlling unit 14. The controlling unit 14 is configured (i.e., structured and arranged) for receiving the signal from the light intensity sensor 12 so as to obtain coordinate values $(X_1, Y_1)$ of the sensing area irradiated by a light beam. The controlling unit 14 then compares the signal with the recorded information representative of the coordinate values $(X_2, Y_2)$ of the center of image sensor 102 to obtain a coordinate relationship between the coordinate values $(X_1, Y_1)$ of the sensing area and the initial coordinate values $(X_2, Y_2)$ of the center of image sensor 102. A control signal based upon the coordinate relationship is generated, and outputted into the lens module holding device 13 to instruct it. Thereafter, the lens module holding device 13 can move the lens module 110 toward the image sensor module 100 in a manner such that the optical axis of the lens module 110 is aligned with the center of the image sensor 102 and then engaged with the base member 101.

In the illustrated embodiment, the parallel light emitted from the parallel light source 131 is emitted in a direction parallel to the optical axis of the lens module 110 vertically incident on the lens module 110 and converges at a focus point 106 on the light intensity sensor 12, after passing through the lens module 110. It is noted that, the focus point 106 corresponds to an image center of the lens module 110 that coincides with the optical axis thereof. In other words, if the image center of the lens module 110 is moved to the center of the image sensor 102, as a result that the optical axis of the lens module 110 will aligned with the center of the image sensor 102.

Figure 4:
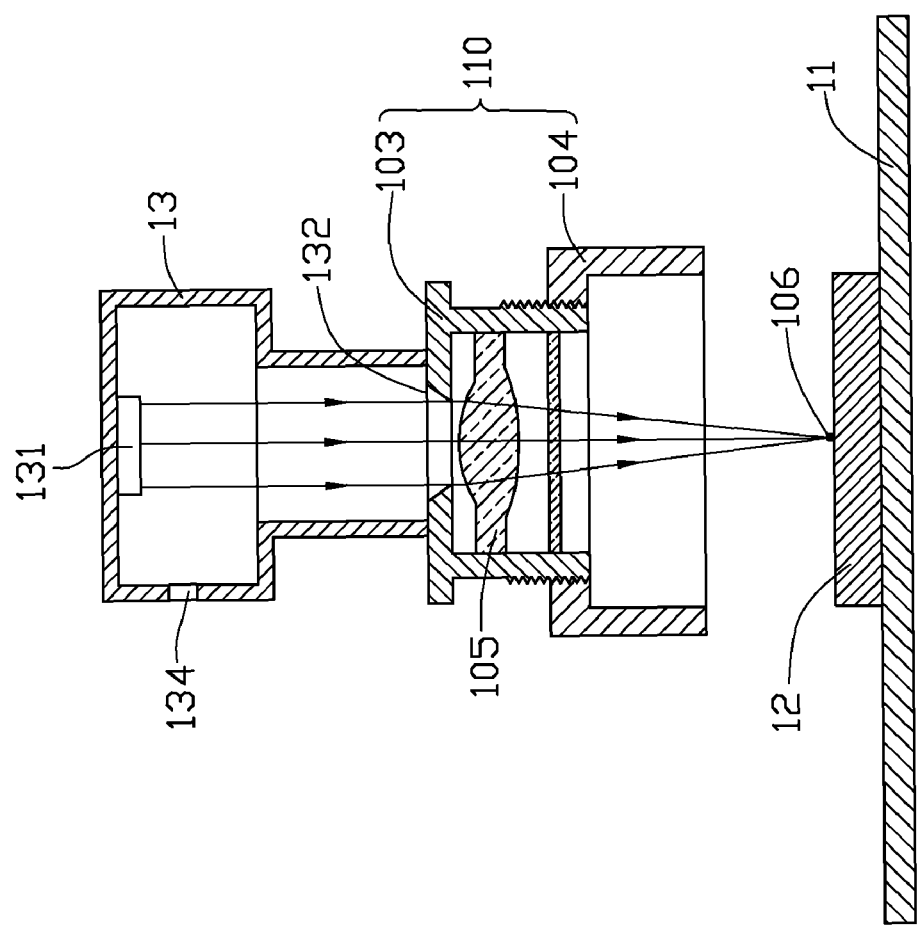
FIG. 4 is a schematic, cross-sectional views of the system and the lens module in FIG. 3, taking along line IV-IV.
Figure 5:
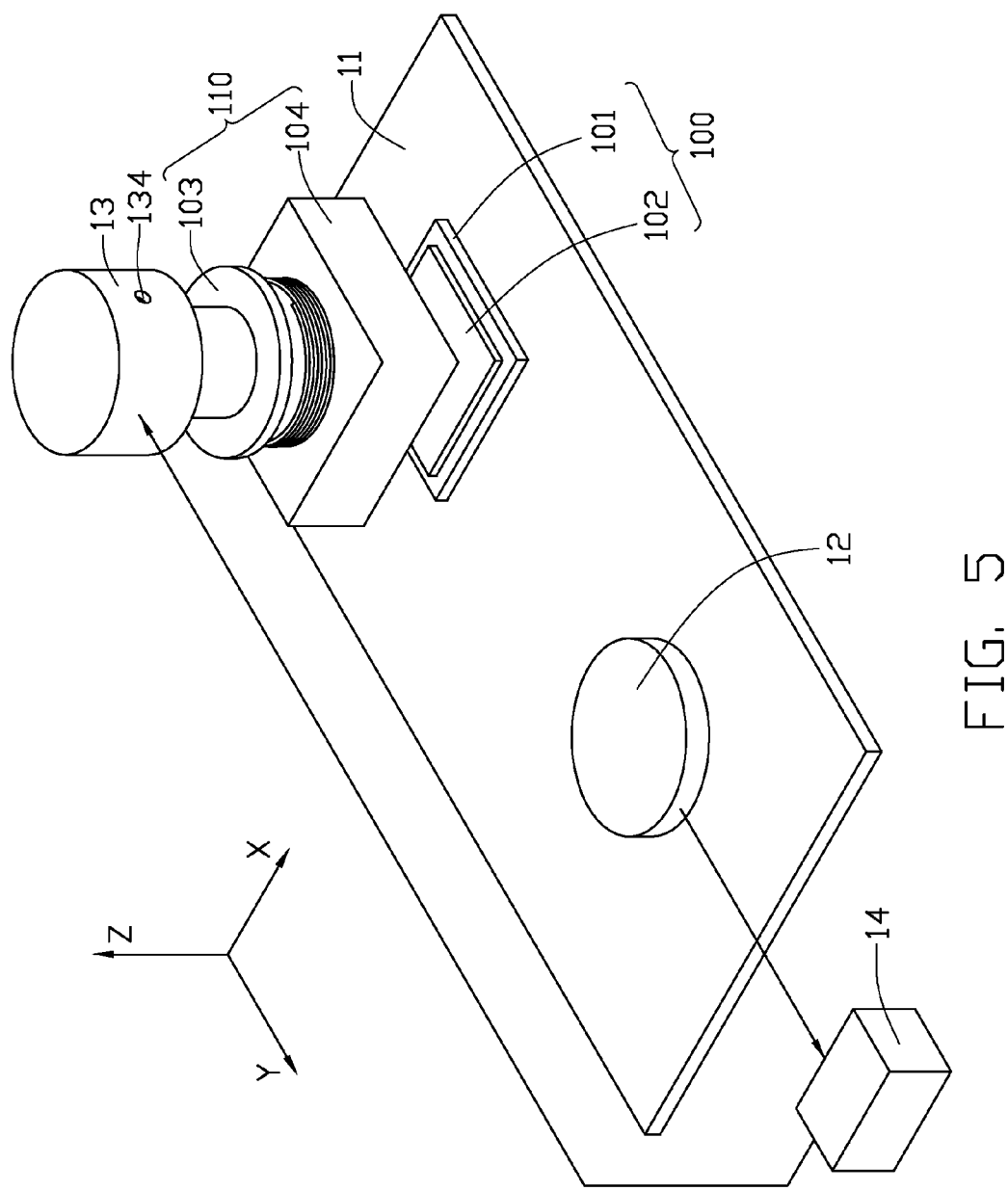
FIG. 5 is a subsequent stage of the process of FIG. 3, for engaging the lens module with an image sensor.

Referring to FIGS. 3 through 5, a process for assembling a camera module using the system 10, in accordance with a second preferred embodiment, is provided. Generally, the lens module 110 includes a lens barrel 103, at least one lens group 105 received in the lens barrel 103, and a lens holder 104 threadedly coupled with the lens barrel 103. The process for assembling a camera module includes a series of steps.

In particular, an image sensor 100 is placed in a predetermined position of the worktable 11, and the center of image sensor 102 has coordinate values $(X_2, Y_2)$ defined thereon. A light intensity sensor 12 should be arranged on the worktable 11. A lens module 110 that having an optical axis associate therewith is provided. The lens module 110 is held and moved in a manner such that the lens module 110 is arranged above the light intensity sensor 12 with the optical axis associated with the lens module 110 is oriented perpendicular to a main plane of the worktable 11 by means of the suction opening 132 of the lens module holding device 13. The parallel light is vertically projected toward at least one lens group 105 of the lens barrel 103. The parallel light converge at a focus point 106 on at least one sensing area of the light intensity sensor 12. The focus point 106 location is detected and a signal associated with coordinate values $(X_1, Y_1)$ of the focus point 106 then generated using the light intensity sensor 12. The signal is then transmitted to the controlling unit 14. The lens module holding device 13 moves the lens module 110 toward the image sensor module 100 according to the received signal representative of the coordinate values $(X_1, Y_1)$ of the focus point 106, such that the optical axis of the lens module 110 is aligned with the center of the image sensor 102 based upon a coordinate relationship between the coordinate values $(X_1, Y_1)$ and the coordinate values $(X_2, Y_2)$. Thereafter, the lens module 110 is moved to just above the image sensor 102 and aligns the optical axis of the lens module 110 with the center of the image sensor 102. After the optical axis of the lens module 110 is aligned with the center of the image sensor 102, the lens holder 104 will be engaged with the base member 101 by means of the lens module holding device 13 moving close to the worktable 11, as shown in FIG. 5.

Advantageously, many methods can be used to engage the lens holder 104 with the base member 101, such as cementing method, locked method etc. Preferably, a step of coating adhesive onto the base member 101 before the step of moving the lens module to right above the light intensity sensor 12 or after the step of moving the lens module to align the center of the image sensor 102 with an optical axis thereof and before the step of moving the lens module to engage with the base member 101.

Furthermore it can be understood that a number of base member 101 on which the image sensor 102 is assembled, are placed at predetermined positions on the worktable 11, and information representative of coordinate values of the center of image sensors 102 on the worktable 11 are recorded in the controlling unit 14. The controlling unit 14 receives the signal representative of coordinate values of the sensing area irradiated by light beam generated by the light intensity sensor 12. The controlling unit 14 then compares the signal with the recorded information so as to obtain a coordinate relationship between the coordinate values of the sensing area and the coordinate values of the center of image sensor corresponding to the information compared. The controlling unit 14 generates a control signal based upon the coordinate relationship and outputs the control signal into the lens module holding device 13. Thereafter, the lens module 110 could be moved to align the optical axis thereof with the center of image sensor 102 and then engaged with the base member 101, via the lens module holding device 13 under the control of the control signal. Thereby, the next lens module 110 could be held in engagement with the base member 101 by means of the lens module holding device 13 aligning the optical axis of the lens module with the center of the image sensor after a camera module has been assembled. This result in an improved assembly efficiency of the assembling processes for camera modules.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for assembling a camera module, the camera module having a lens module and an image sensor module, the lens module having an optical axis associated therewith, the image sensor module including a base and an image sensor mounted on the base, the system comprising:
    a worktable with a coordinate system defined thereon, the worktable being configured for providing placement of the image sensor module thereon, thus a center of the image sensor of the image sensor module having a coordinate value thereof;
    a light intensity sensor arranged on the worktable;
    a lens module holding device configured for holding and moving the lens module in a manner that the lens module is arranged above the light intensity sensor with the optical axis associated with the lens module perpendicular to a main plane of the worktable, the lens module holding device having a parallel light source configured for emitting parallel lights toward the lens module, the parallel lights being parallel to the optical axis of the lens module, the parallel lights converging at a focus point on the light intensity sensor, wherein the light intensity sensor is configured for detecting the focus point location and generating a signal associated with a coordinate value of the focus point; and
    a controlling unit configured for receiving the signal from the light intensity sensor and controlling the lens module holding device to move the lens module toward the image sensor module such that the optical axis of the lens module is aligned with the center of the image sensor based upon a coordinate relationship between the coordinate values of the focus point and the center of the image sensor.

2. The system of claim 1, wherein the parallel light source is arranged in a vacuum chamber.

3. The system of claim 1, wherein the lens module holding device comprises a vacuum chamber having a suction opening configured for capturing the lens module by a suction force.

4. A process for assembling a camera, comprising:
    placing an image sensor module on a worktable, the image sensor module including a base and an image sensor mounted on the base, the worktable having a coordinate system defined thereon, thus a center of the image sensor of the image sensor module having coordinate values thereof;
    arranging a light intensity sensor on the worktable;
    providing a lens module having an optical axis associate therewith;
    holding and moving the lens module in a manner that the lens module is arranged above the light intensity sensor with the optical axis associated with the lens module oriented perpendicularly to a main plane of the worktable;
    emitting a plurality of parallel lights toward the lens module, the lights being parallel to the optical axis of the lens module such that the lights converge at a focus point on the light intensity sensor;
    detecting the focus point location and generating a signal associated with a coordinate value of the focus point using the light intensity sensor; and
    receiving the signal from the light intensity sensor and controlling the lens module holding device to move the lens module toward the image sensor module such that the optical axis of the lens module is aligned with the center of the image sensor based upon a coordinate relationship between the coordinate values of the focus point and the center of the image sensor.

5. The process of claim 4, further comprising a step of coupling the image sensor module to the lens module.

6. The process of claim 5, further comprising a step of applying an adhesive on the base.

* * * * *